3,485,783
HOT MELT ADHESIVE COMPOSITION
Alfred W. Kehe, Berkeley, Ill., assignor to Continental Can Company, Inc., New York, N.Y., a corporation of New York
No Drawing. Filed Oct. 16, 1967, Ser. No. 675,312
Int. Cl. C08f 41/12
U.S. Cl. 260—27                    8 Claims

ABSTRACT OF THE DISCLOSURE

A hot melt adhesive having improved stress crack resistance is prepared from a homogenous blend of an ethylene/alkyl acrylate copolymer, an ethylene/acrylic acid copolymer, and a polymerized rosin ester.

BACKGROUND OF INVENTION

Field of invention

This invention relates to a hot melt adhesive composition and more particularly to a hot melt adhesive composition having improved stress crack resistance.

The prior art

A hot melt adhesive is an adhesive composed wholly of thermoplastic substances, without solvents. The adhesive is applied to the substrate to be adhered by the so-called hot melt extrusion process wherein the thermoplastic adhesive is first melted and the molten material extruded through a die to form a molten bead or film which is deposited onto the substrate.

Hot melt adhesives are important in the manufacture of containers, especially fiber containers. In the manufacture of fiber containers, the body is formed into a square or tubular shape and the edges of the fiber blank from which the body is made are brought together in lapped relation. A sealed joint is made by pressing the overlapped edges together with the hot melt adhesive interposed between the laps. This may be done by suitable rollers or the like which may be heated or cooled as required in order to produce the desired bond of the fiber sections.

Thermoplastic materials which have been used as hot melt adhesives include ethylene polymers, such as polyethylene, ethylene/ethyl acrylate and ethylene/acrylic acid copolymers.

One disadvantage in the use of these materials in container manufacture is that these thermoplastic materials have a tendency to split and crack when exposed to or contacted with polar organic liquids, such as the lower alcohols, methanol and ethanol, as well as aliphatic hydrocarbons, such as motor oils, which are packaged in these containers.

The cracking of the thermoplastic material, referred to in the art as stress cracking, is undesirable as it destroys the bonding integrity of the container, resulting in separation or delamination of the overlapped edges of the container which causes the container to come apart.

Many expedients have been proposed in order to overcome the undesirable cracking of the adhesive material, but none has resulted in a satisfactory solution to the problem.

SUMMARY OF THE INVENTION

In accordance with the present invention, a hot melt adhesive having improved stress crack resistance is prepared from a mixture of an ethylene/alkyl acrylate copolymer, an ethylene/acrylic acid copolymer, and a polymerized rosin ester. The composition of the present invention has extremely good adhesive properties and is resistant to stress cracking by a wide range of materials and temperature environments.

PREFERRED EMBODIMENTS

By the term "alkyl acrylate" as used in the present specification and claims is meant alkyl esters of acrylic acid wherein the alkyl group contains from 1 to 12 carbon atoms inclusive, and preferably from 2 to 8 carbon atoms inclusive. Examples of such alkyl acrylates include methyl acrylate, ethyl acrylate, n-propyl acrylate, isopropyl acrylate, n-butyl acrylate, t-butyl acrylate, pentyl acrylate, hexyl acrylate, 2-ethylhexyl acrylate, octyl acrylate, decyl acrylate, dodecyl acrylate and the like. The alkyl acrylates which are preferred in the preparation of the compositions of the present invention are the normally solid copolymers of ethylene and ethyl acrylate containing in polymerized form about 27 to about 32 percent by weight ethyl acrylate, a melt index between 15 and 100, and a density between 0.925 to 0.940 gram/cc. at 23° C.

The ethylene/acrylic acid copolymers which may be employed to prepare the compositions of the present invention are random copolymers of ethylene and acrylic acid in which the copolymer contains, in polymerized form, from about 2 to about 12 percent by weight acrylic acid and preferably about 3 to about 5 percent by weight acrylic acid.

By the term "an acrylic acid" as used throughout this specification is meant an $\alpha,\beta$-monoethylenically unsaturated monocarboxylic acid having 3 to 7 carbon atoms. Representative specific examples of such acids are acrylic acid, methacrylic acid, ethacrylic acid, crotonic acid, isocrotonic acid, tilgic acid, angelic acid, and senecioic acid. Among these, acrylic acid itself ($CH_2=CH-COOH$) is preferred.

Illustrative of the polymerized rosin ester used to prepare the composition of the present invention are the glycol and glycerol esters of polymerized rosin, the glycerol ester being preferred. The glycols suitable for the esterification of the polymerized rosin are those having from 2 to 4 carbon atoms.

In preparing the adhesive compositions of the present invention, it is a critical feature of the invention that the composition contain at least 40% by weight of the polymerized rosin ester and at least 25% of the ethylene/alkyl acrylate copolymer. If less than these ranges are used for the polymerized rosin ester and the ethylene/alkyl acrylate copolymer, the resultant compositions have unacceptable stress crack resistance. Generally, the compositions of the present invention contain from 40% to 45% of the polymerized rosin ester, from 25% to about 30% by weight of the ethylene/alkyl acrylate copolymer, and from 25% to about 35% by weight of the ethylene/acrylic acid copolymer.

The compositions of this invention are homogenous blends and can be prepared by mixing the polymers in conventional mixing equipment, such as jacketed dough mixers, roll mixers, or impeller mixers, by extrusion or by fluxing the polymers.

In a preferred method of preparing the compositions of the present invention, the polymerized rosin ester is first melted. When this is completely molten, the ethylene/alkyl acrylate copolymer is then added, preferably in small quantities, preferably one-third the required amount. After each ethylene/alkyl acrylate copolymer addition, slow speed agitation is employed to insure dissolution and prevention of undue air entrapment. The ingredients are mixed for a period of time until a uniform molten mixture is formed. The ethylene/acrylic acid copolymer is then added and also agitated until a clear and essentially bubble-free solution is obtained. The entire mixture is stirred to thoroughly blend all the materials in the composition. The adhesive is now ready for immediate use or it can be cast into molds and solidified for shipment.

The blend compositions of this invention may also contain various additives, for example, plasticizers, stabilizers, lubricants and anti-oxidants. Such additives are well known and may be added to the compositions of this invention in convenient amounts, as is known by those skilled in the art, without detriment to the stress crack resistance of the compositions. Illustrative of such additives are substituted phenols, thio bisphenol, aromatic amines, fatty acid amides, waxes, titanium dioxide, and the like. The incorporation in the blend compositions of the present invention of about 10% to about 20% by weight based on the weight of the composition of finely divided particles (i.e., a particle size of less than 100 microns) of flake type minerals such as leafing aluminum, flake mica, aluminum silicate clays, and the like, has a material effect in improving the moisture and gas permeability of the composition.

To improve the stability of the hot metal adhesive composition of the present invention to heat degradation due to the high temperatures (e.g., 205° to 230° C.) encountered in applying the adhesive, small quantities of a suitable heat stabilizer may also be incorporated in the hot melt composition. A preferred stabilizer is butyl hydroxy toluene.

The following examples illustrate the present invention but are not intended to limit it in any way.

EXAMPLE I

A hot melt adhesive formulation was prepared by first heating the glycerol ester of polymerized rosin between 420° and 450° F. in a kettle provided with a slow speed agitation mixer. The molten ester was mixed until a bubble-free solution was obtained. The polymerized rosin ester was the condensation product of glycerol and a polymerized rosin available commercially under the trade name Polypale Ester 10. The glycerol ester of the polymerized rosin had a specific gravity of 1.08 (20° C.), a softening point of 109° to 119° C., a maximum acid number of 8, and a viscosity of 150 centipoise (Gardner-Holdt). The polymerized rosin ester is insoluble in all alcohols.

To the molten polymerized rosin ester was added an ethylene/ethyl acrylate copolymer containing 70% by weight ethylene and 30% by weight ethyl acrylate having a melt index of 20. The ethylene/ethyl acrylate copolymer was added to the molten polymerized rosin ester at 450° F. in three separate additions. After each copolymer addition, slow speed mixer agitation was employed to insure dissolution and the prevention of undue air entrapment. After a homogenous solution was obtained, the temperature of the molten blend was reduced to 400° F. To the molten solution was added an ethylene/acrylic acid copolymer containing 96% by weight ethylene and 4% by weight acrylic acid having a molecular weight of 3000.

To the molten solution was also added 0.1% based on the weight of the blend components of butyl hydroxy toluene.

The mixture was stirred again to thoroughly blend all the materials in the composition. The homogenous blend was then cast into billets by pouring the molten mixture into Teflon-lined pans and allowing the molten blend solution to solidify with cooling.

Sheets were molded from the above blend compositions to a thickness of 0.125 inch. Samples 1.5 in. x 0.5 in. were cut from each sheet, and a 0.75 in. slit, 0.020 to 0.025 in. deep was cut lengthwise, centered on one side of each sample. The samples were bent and inserted in a ¾ inch test tube with the slit on the outside of the bend. The samples were then subjected to the action of ethanol at 50° C. The time required for the first visible crack to appear in the sample was noted with the results tabulated in the table below.

For purposes of comparison, the stress crack resistance of blend compositions of ethylene/ethyl acrylate copolymers, ethylene/acrylic acid copolymers, and a glycerol ester of polymerized rosin were prepared in a manner identical to the procedure of the above example with the exception that the components were blended in proportions outside the ranges used in the compositions of the present invention. The time required for cracking was noted with the results also tabulated in the table below.

TABLE

| Blend component | Composition No. | | | | | |
|---|---|---|---|---|---|---|
| | 1 | 2 | 3 | 4 | 5 | 6 |
| | Weight percent of component | | | | | |
| Ethylene/acrylic acid | 35 | 40 | 40 | 50 | 40 | 50 |
| Ethylene/ethyl acrylate | 25 | 40 | 30 | 30 | 30 | 30 |
| Polymerized rosin ester | 40 | 20 | 30 | 20 | 30 | 20 |
| Stress Crack Resistance | [1] >2 | [2] <1 | [2] <1 | [2] <1 | [2] <1 | [2] <1 |

[1] Hours. [2] Minutes.

By referring to the table, it is at once apparent that adhesive compositions containing an ethylene/acrylic acid copolymer, ethylene/ethyl acrylate copolymer and a polymerized rosin ester blended in the proportions of the present invention (Composition No. 1) showed improved stress crack resistance over blends of identical polymeric components blended in proportions outside the scope of the present invention.

By way of further contrast, a composition composed of 35% by weight ethylene/acrylic acid, 25% by weight ethylene/ethyl acrylate, and 40% by weight of a glycerol ester of a hydrogenated rosin had a stress crack resistance in ethanol of less than 1 minute.

EXAMPLE II

Samples of polyethylene coated kraft paper used in the manufacture of fiber containers were ribbon-stripped with the hot melt adhesive prepared in Example I. The adhesive strip, 10 to 15 mils in thickness, exhibited excellent adhesion to the polyethylene-coated paper and maintained this adhesion after three weeks' exposure to 10% and 50% acetic acid, 20% phosphoric acid, 5% sodium hydroxide, 75% aerosol OT, and motor oil media at 77° F. No cracking of the adhesive strip was observed.

EXAMPLE III

The moisture vapor transmission value (ASTM E96–63T) of Composition 1 of the table in Example I was found to be 0.343 gram/100 sq. in. of 10 mil film/24 hrs./100° F./95% RH and the oxygen permeation value (ASTM D1434–63) was 22.2 cc./100 sq. in. of 10 mil film/24 hrs./77° F. By incorporating in the composition 10% by weight of a leafing aluminum powder having a particle size of less than 44 microns and a weight per solid gallon of 21.24 pounds, the resultant moisture vapor transmission value was found to be 0.126 gram/100 sq. in. of 10 mil film/24 hrs./100° F./95% RH, and the oxygen permeation value was found to be 12.84 cc./100 sq. in. of 10 mil film/24 hrs./77° F.

What is claimed is:

1. A composition of matter comprising a homogenous mixture of about 40% to about 45% by weight of a polymerized rosin ester, the ester being the esterification product of a polymerized rosin acid and a compound selected from the group consisting of glycerol and glycols having 2 to 4 carbon atoms, 25% to about 30% by weight of an ethylene alkyl acrylate copolymer wherein the alkyl group contains 1 to 12 carbon atoms, and about 25% to about 35% by weight of a copolymer of ethylene and an $\alpha,\beta$-monoethylenically unsaturated monocarboxylic acid having from 3 to 7 carbon atoms.

2. The composition of claim 1 wherein the polymerized rosin ester is the glycerol ester of polymerized rosin.

3. The composition of claim 1 wherein the ethylene/alkyl acrylate copolymer is ethylene/ethyl acrylate.

4. The composition of claim 3 wherein the ethylene/ethyl acrylate copolymer contains about 27% to about 32% by weight ethyl acrylate.

5. The composition of claim 1 wherein the ethylene/$\alpha,\beta$-monoethylenically unsaturated monocarboxylic acid copolymer is an ethylene/acrylic acid copolymer.

6. The composition of claim 5 wherein the ethylene/acrylic acid copolymer contains, in polymerized form, about 3% to about 5% by weight acrylic acid.

7. A composition of matter comprising a homogenous mixture of about 40% to about 45% of a polymerized rosin ester, the ester being the esterification product of a polymerized rosin acid and a compound selected from the group consisting of a glycerol and glycols having 2 to 4 carbon atoms, 25% to about 35% by weight of an ethylene/alkyl acrylate copolymer, wherein the alkyl group contains 1 to 12 carbon atoms, and about 25% to about 35% by weight of a copolymer of ethylene and an $\alpha,\beta$-monoethylenically unsaturated monocarboxylic acid having from 3 to 7 carbon atoms, and about 10% to about 20% by weight based on the composition of a flake type mineral powder.

8. The composition of claim 7 wherein the mineral powder is a leafing aluminum.

References Cited

UNITED STATES PATENTS

| | | | |
|---|---|---|---|
| 3,043,787 | 7/1962 | Bonvicini et al. | 260—27 |
| 3,232,895 | 2/1966 | Klein et al. | 260—27 |
| 3,298,855 | 1/1967 | Helin et al. | 260—897 |
| 3,377,305 | 4/1968 | House | 260—27 |

FOREIGN PATENTS

| | | |
|---|---|---|
| 857,507 | 12/1960 | Great Britain. |
| 1,015,260 | 12/1965 | Great Britain. |

DONALD E. CZAJA, Primary Examiner

W. E. PARKER, Assistant Examiner

U.S. Cl. X.R.

260—897, 901